UNITED STATES PATENT OFFICE.

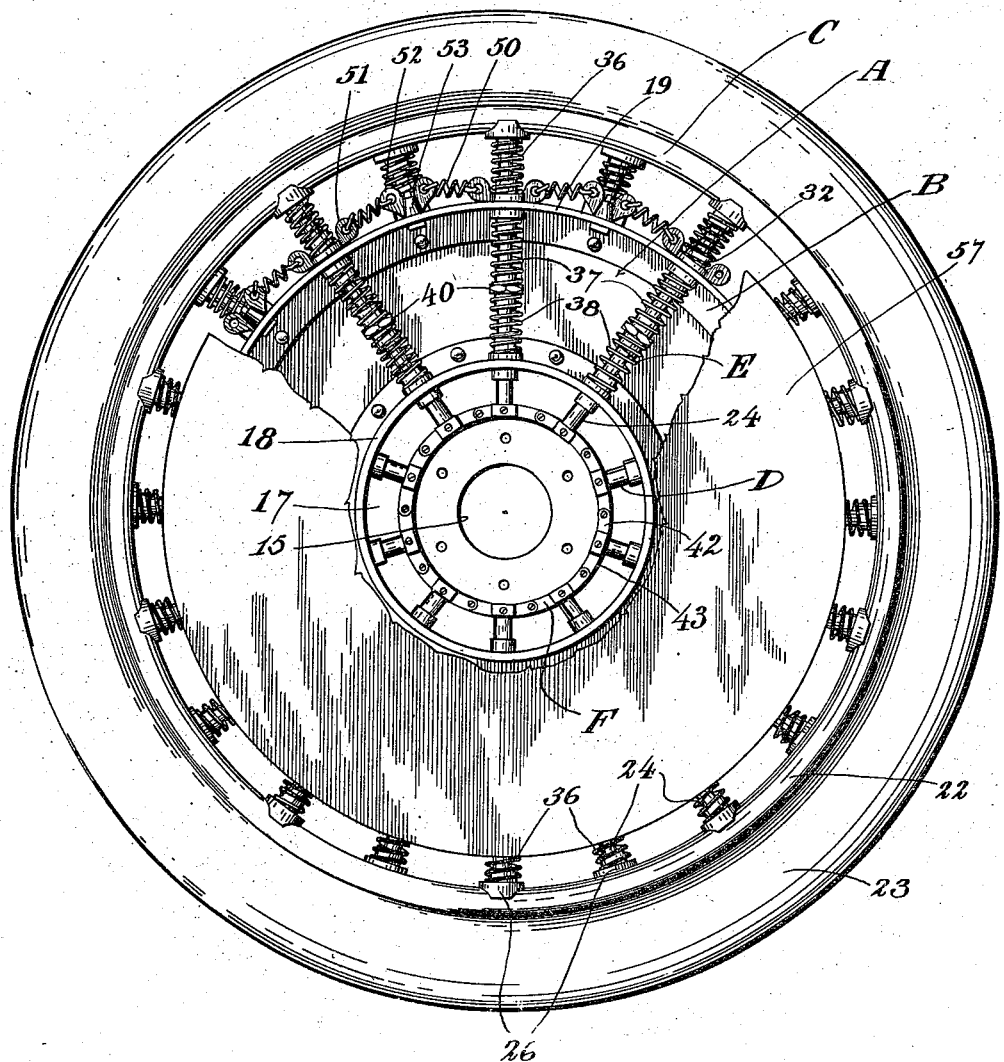

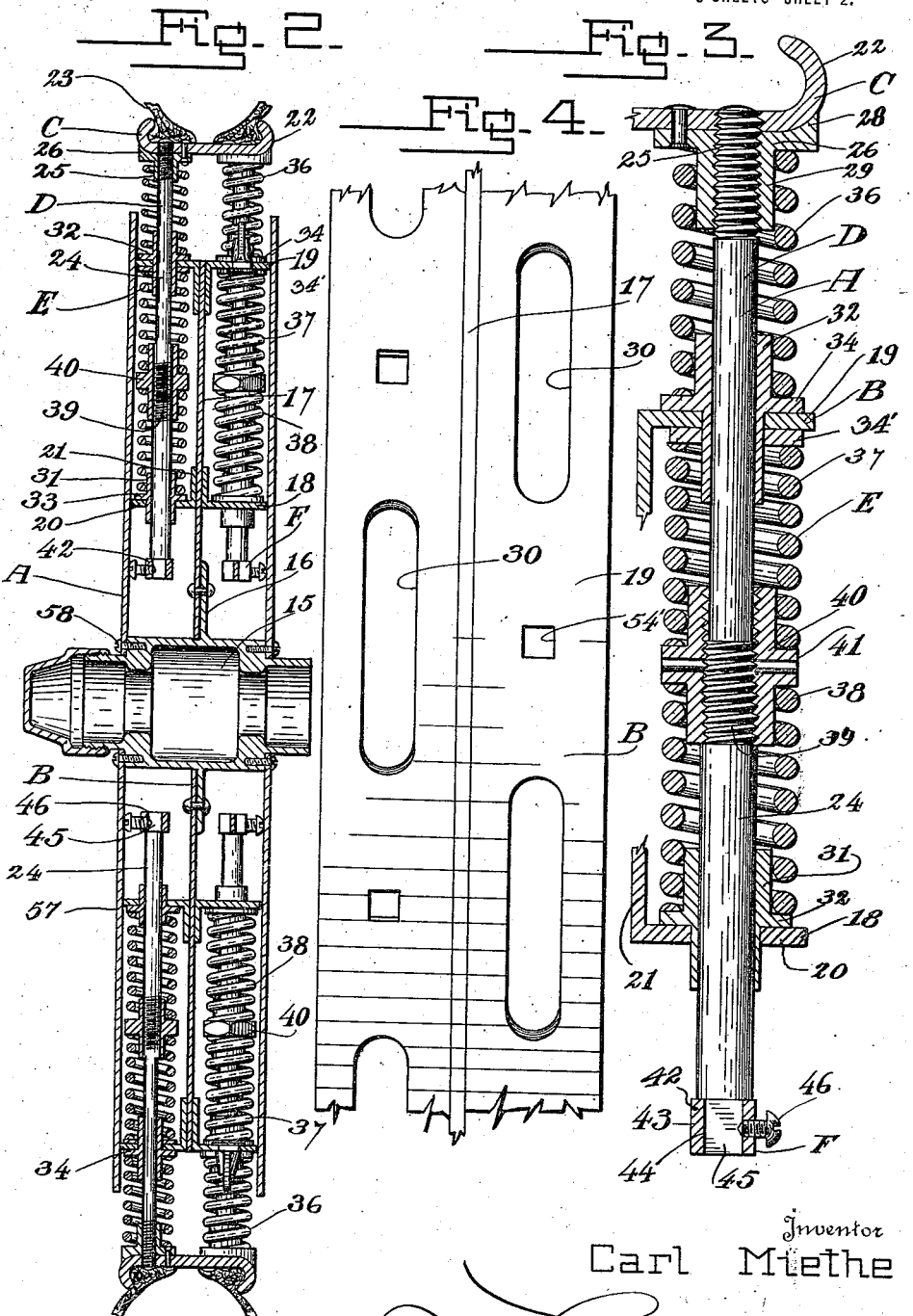

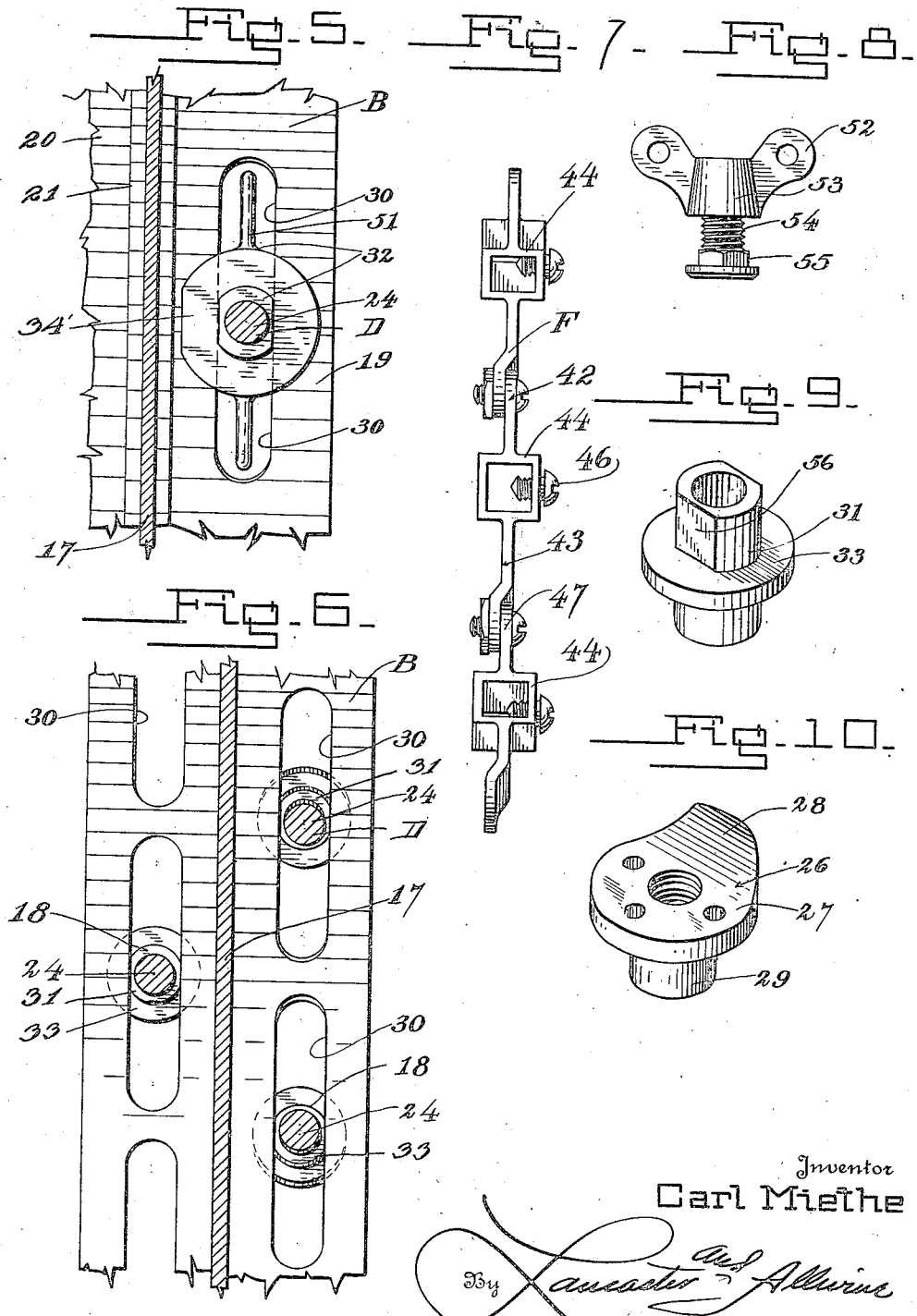

CARL MIETHE, OF CHICAGO, ILLINOIS.

VEHICLE SPRING WHEEL.

1,421,808.   Specification of Letters Patent.   Patented July 4, 1922.

Application filed June 13, 1921. Serial No. 477,179.

*To all whom it may concern:*

Be it known that I, CARL MIETHE, a citizen of the United States, residing at Chicago, in the county of Cook and State of Illinois, have invented certain new and useful Improvements in Vehicle Spring Wheels, of which the following is a specification.

This invention relates to vehicle wheels, and the primary object of the invention is to provide a novel wheel of simple and durable character embodying resilient means for absorbing shock and for facilitating in the supporting of a part of the vehicle load, said resilient means eliminating the necessity of utilizing pneumatic tires, as now employed on motor vehicles, and consequently eliminating the inconveniences and cost contingent thereon.

Further objects of the invention are to provide in a spring wheel, which is particularly adaptable for motor vehicles; first, a novel means for slidably connecting a rigid felly construction embodying a plurality of rigid spokes with a novel rigid hub construction; second, to provide a novel means for resiliently connecting the spokes to the hub construction; third, to provide a novel means for connecting the inner ends of the spokes together, to provide a novel means for holding the hub in correct relation to the spokes at all times.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a side elevation of a wheel constructed in accordance with this invention, one of the side plates of the wheel being shown broken away.

Figure 2 is a diametric section through the wheel.

Figure 3 is an enlarged fragmentary diametric section through a portion of the wheel illustrating the means for resiliently connecting the hub and felly construction together.

Figure 4 is a fragmentary plan view of the novel hub construction.

Figure 5 is an enlarged fragmentary section through a portion of the hub construction, showing an inner face view of the outer rim portion of the hub construction.

Figure 6 is an enlarged fragmentary section through a portion of the hub construction, showing an inner face view of the inner rim portion of the hub construction.

Figure 7 is an enlarged fragmentary edge elevation of a portion of the ring construction for connecting the inner ends of the spokes together.

Figure 8 is an enlarged detail side elevation of one of the members utilized for anchoring the centering springs in position.

Figure 9 is a detail perspective view of one of the sliding sleeve members, which are carried by the spokes, and Figure 10 is a detail perspective view of one of the socket members, which are utilized for connecting the outer ends of the spokes to the felly construction.

Referring to the drawings in detail, wherein similar reference characters designate corresponding parts throughout the several views, the letter A indicates the improved resilient wheel, which includes the novel hub construction B; the felly construction C; the means D for slidably connecting the hub B and the felly C together; the spring means E carried by the slidable connection D for resiliently connecting the hub and felly constructions; and F, the novel means for connecting the inner ends of the spokes, which constitute the means for slidably connecting the hub and felly construction together.

The hub construction B includes the usual hub sleeve 15 having formed thereon intermediate its ends, the outwardly extending annular attaching flange 16. This flange 16 has secured thereto the centrally disposed disc body 17. The disc body 17 has secured thereto the inner and outer rim or band member 18 and 19. The inner and outer rim or band members 18 and 19 are arranged on opposite sides of the disc body 17, and each include annular bodies 20 and angular attaching flanges 21.

The felly construction C may be of any preferred character, and includes the annular member 22, which surrounds the hub construction B, in spaced relation to the outer rim constructions 19 thereof. The felly C can, if so desired, support any suitable type of tire, which is designated by the numeral 23.

The means D for slidably connecting the felly construction C with the hub construction B, includes a plurality of spokes 24, which are arranged in staggered relation to each other on the opposite sides of the disc body 17. The outer ends of the spokes 24, are threaded, as at 25, for insertion into sockets 26, which are riveted, or otherwise secured in staggered relation on the inner surface of the annular body 22 of the felly construction C. These socket members 26 each include a base member or plate 27, the inner surface of which is shaped to conform to the configuration of the felly, and the base plate is provided with an inwardly extending lip 28, which is adapted to overhang the side edges of the felly, in order to eliminate any twisting or turning movement thereof on the felly. Radially extending nipples 29 are formed on the base plates 27, and these nipples are internally threaded for receiving the threaded ends 25 of the spokes 24.

The inner and outer rim or band members 18 and 19 of the hub construction B on each side of the body 17 thereof are provided with slots 30, and these slots 30 are arranged in staggered relation to each other on each side of the disc body 17. As clearly shown in Figures 2 and 3 of the drawings, the spokes 24 slidably extend through the slots. The spokes 24 are slidably mounted in inner and outer bearing members 31 and 32, which extend through the slots 30 and are arranged for sliding movement longitudinally of the slots. These bearing members 31 are provided with flanges 33, for engaging the outer face of the inner band member 18, while the bearing members 32 are provided with integral flanges 34 and washers 34' for engaging both faces of the outer band member 19. By providing these bearing members 31 and 32, it can be seen that the spokes are permitted of radial movement in relation to the hub construction, and movement tangentially of the hub construction.

The spring means E for resiliently connecting the hub construction B with the felly C includes outer helical springs 36, intermediate helical springs 37 and inner helical springs 38. These springs are coiled around the spokes 24, and are positioned respectively between the felly C and the outer band 19 of the hub construction, and between the inner and outer bands 18 and 19 of the hub construction. The spokes 24, intermediate their ends, are threaded as at 39 for nuts 40, against which the inner ends of the springs 37 and 38 are adapted to abut. These nuts 40 are provided with sleeves for engaging the inner convolutions of these springs. The opposite ends of the springs 38 receive the inner ends of the bearing members 31 and abut against the flanges 33 thereof. The outer ends of the springs 37 engage the inner ends of the bearing members 32 and abut against the washers 34' thereof. The outer springs 36 engage the socket members 26 and the flanges 34 of the bearing members 32. It can be seen that by adjusting the nuts 40, the tension of the springs 37 and 38 can be regulated, and in order to hold these nuts 40 against accidental rotation, suitable pins 41 can be driven into engagement with the threads 39 formed on the spokes 24.

The means F for connecting the inner ends of the spokes 24 together, consists of a ring 42, which includes a plurality of links 43. Each of these links 43 includes a centrally positioned socket member 44, which is adapted to receive the squared inner terminals 45 formed on the spokes 24. The square terminals 45 of the spokes are held against displacement from the sockets 44 by suitable set screws or the like 46. The opposite ends of the links 43 are connected together by suitable bolts 47. If so desired the ends of the links may be offset, so that the socket portions 44 thereof will all lie in the same plane.

The ring 42 serves as a means for centering the inner ends of the spokes in the slots 30 formed in the inner band member 18 of the hub construction B.

In order to hold the spokes 24 in correct position in the slots 30 formed in the outer band member 19 of the hub portion B, contractile coil springs 50 are utilized. These coil springs 50 are arranged in annular formation, and have their terminals connected respectively to ears 51 which are formed on outer guide or bearing members 32, and ears 52 which are formed on anchor members 53, which are carried by suitable retaining bolts 54, which are secured to the outer band 19 of the hub portion B intermediate the spokes 24. The inner portions of the shanks of the bolts 54 are polygonal shaped in cross section, as indicated by the numeral 55, in order to prevent twisting movement thereof in the openings 54' formed in the outer band 19. By this construction, it can be seen that the springs 50 will exert an equal pull on the spokes, and thus tend to center the same in the slots 30.

In order to prevent rotation of the guide members 31 and 32 in the slot 30, the opposite sides thereof are preferably flattened as at 56, and these flattened portions slidably engage the side walls of the slots, as clearly shown in Figures 5 and 6 of the drawings.

If so desired, a suitable casing or housing can be provided for the wheel in order to prevent the accumulation of dust on the springs, and in order to hide the springs from view, and as shown side plates 57 are provided. These plates 57 are secured as at 58 to the hub sleeve 15 of the hub construction. It is to be understood, however, that the plates can be, if so desired, carried by the rim construction C or may be associated with the wheel in any other preferred or desired manner.

When the wheel is under load, it will be seen that the hub construction B will be moved toward the lower end of the wheel, and will slide downwardly on the lower and upper spokes, and in lateral path on the side spokes through the medium of the slots 30. This movement will be resisted by the springs on the spokes, which will absorb shock incident to the travel of the vehicle over the roadway, and support a part of the weight of the vehicle.

By arranging the spokes in staggered relation, it can be seen that additional strength is given to the wheel, and that the strain will be more equally distributed throughout the wheel.

From the foregoing description, it can be seen that a novel resilient wheel has been formed, which will effectively absorb shock incident to the travel of a vehicle over a roadway, and which will eliminate the necessity of providing pneumatic tires for this purpose.

Changes in details may be made without departing from the spirit or scope of this invention; but,

I claim:

1. A spring wheel comprising a hub construction including a plurality of spaced annular bands, a felly construction surrounding the hub construction, a plurality of inwardly extending radially disposed spokes carried by the felly, the spaced bands formed on the hub construction having a plurality of slots therein arranged to receive the spokes, and shock absorbing springs coiled about said spokes and engaging respectively between the bands of the hub construction and between the outer band of the hub construction and the inner surface of the felly construction.

2. In a spring wheel, a hub construction including a hub sleeve, a centrally disposed disc carried by the hub sleeve, outwardly extending spaced bands carried by the opposite faces of the disc body, an annular felly member disposed about the hub construction in spaced relation thereto, the bands having a plurality of spaced circumferentially extending slots formed therein, guide members slidably mounted in the slots, spokes rigidly carried by the inner face of the felly and slidably mounted in the guide members, means connecting the inner ends of the spokes together, and coil springs carried by the spokes and arranged intermediate the bands of the hub construction and between the outer band of the hub construction and the felly construction.

3. In a spring wheel, a hub construction including a hub sleeve, a centrally disposed disc carried by the hub sleeve, outwardly extending spaced bands carried by the opposite faces of the disc body, an annular felly member disposed about the hub construction in spaced relation thereto, the bands having a plurality of spaced circumferentially extending slots formed therein, guide members slidably mounted in the slots, spokes rigidly carried by the inner face of the felly and slidably mounted in the guide members, means connecting the inner ends of the spokes together, coil springs carried by the spokes and arranged intermediate the bands of the hub construction and intermediate the outer band of the hub construction and the felly construction, and contractile coil springs connecting the guide members together, whereby the spoke members will be normally held in the central portion of said slots.

4. In a spring wheel, a hub construction including a hub sleeve, a disc shaped body carried by the central portion of the sleeve, outwardly extending spaced annular flanges carried by the opposite sides of the disc body, a felly arranged in spaced relation to the outermost flanges, the flanges having circumferentially extending slots formed therein arranged in stepped relation to each other on opposite sides of the disc body, inwardly extending radially disposed spokes carried by the felly, guide members slidably mounted in the slots arranged to slidably receive the spokes, the spokes having a portion thereof intermediate their ends threaded, a nut member threaded on each one of the threaded portions of the spokes, springs coiled around the spokes engaging the opposite faces of the nut members, and the guide members carried by the flanges, and springs coiled about the spokes engaging the inner surface of the felly, and the outer ends of the outermost guide members, anchor members carried by the outermost flanges and arranged intermediate the spokes, and contractile coil springs arranged in annular formation circumferentially of the wheel, having their terminals secured respectively to the anchor members and to the adjacent guide members of the spokes.

5. In a resilient wheel, a hub construction including a sleeve, a disc body secured respectively to the sleeve, outwardly extending spaced flanges formed on the opposite sides of the disc body having slots therein, a felly surrounding the hub construction, a plurality of inwardly extending spokes carried by the felly arranged in staggered relation and mounted in said slots, guide members arranged in the slots for sliding movement arranged to slidably receive the spokes, ring members arranged on the opposite sides of the disc body connecting the inner ends of the spokes together, anchor members secured to the outer flanges and arranged intermediate the slots formed therein, ears formed on the guide members carried by the outermost flanges, contractile coil springs connecting the ears with the anchor members, adjustable members mounted on the spokes, springs coiled about the spokes and engaging the opposite faces of the adjustable members and the guide members slidably mounted in the slots, and outer springs coiled about the spokes and engaging the inner surface of the felly and the outermost guide members.

CARL MIETHE